(12) United States Patent
Shcheglov

(10) Patent No.: US 11,940,105 B2
(45) Date of Patent: Mar. 26, 2024

(54) LAMP WITH FLAME SIMULATION EFFECT ACHIEVED BY LIGHT EMISSION FROM THROUGH HOLES

(71) Applicant: Valentin Shcheglov, Shenzhen (CN)

(72) Inventor: Valentin Shcheglov, Shenzhen (CN)

( * ) Notice: Subject to any disclaimer, the term of this patent is extended or adjusted under 35 U.S.C. 154(b) by 0 days.

(21) Appl. No.: 18/336,034

(22) Filed: Jun. 16, 2023

(65) Prior Publication Data
US 2024/0035635 A1   Feb. 1, 2024

(30) Foreign Application Priority Data

Apr. 21, 2023   (CN) .......................... 202320927740.4

(51) Int. Cl.
*F21S 10/04* (2006.01)
*F21Y 103/10* (2016.01)

(52) U.S. Cl.
CPC ......... *F21S 10/043* (2013.01); *F21Y 2103/10* (2016.08)

(58) Field of Classification Search
CPC .............................................. F21S 10/04–043
See application file for complete search history.

(56) References Cited

U.S. PATENT DOCUMENTS

| 9,478,153 B1 * | 10/2016 | Seder ...................... G09F 11/23 |
| 2012/0242245 A1 | 9/2012 | Pachler |
| 2017/0122512 A1 | 5/2017 | Yuan |
| 2019/0316747 A1 | 10/2019 | Dong |

FOREIGN PATENT DOCUMENTS

| CN | 110159998 A * | 8/2019 | |
| WO | WO-02053973 A1 * | 7/2002 | .............. F21S 10/00 |

* cited by examiner

*Primary Examiner* — Mariceli Santiago
(74) *Attorney, Agent, or Firm* — Zhigang Ma

(57) ABSTRACT

The present disclosure relates to the technical field of candle lamps, and in particular, to a lamp with a flame simulation effect achieved by light emission from through holes. The lamp includes a base, and further includes: a light emitting module, arranged on the base and configured to generate a light source; a light guide portion, arranged on the base and covering the light emitting module, wherein the light guide portion is configured to guide and diffuse the light source generated by the light emitting module; a light shield, arranged on the base and covering the light emitting module, wherein dense through holes for exporting the light source to the outside are formed in the light shield.

11 Claims, 6 Drawing Sheets

LAMP WITH FLAME SIMULATION EFFECT ACHIEVED BY LIGHT EMISSION FROM THROUGH HOLES

TECHNICAL FIELD

The present disclosure relates to the technical field of candle lamps, and in particular, to a lamp with a flame simulation effect achieved by light emission from through holes.

BACKGROUND

Because they are burnt, candles are disposable and can produce smoke or carcinogens, posing a certain harm to users. Therefore, candle lamps have been provided on the market. Light emitting diodes (LEDs) are combined with flame light guides to simulate a light effect of real candles. Since the LEDs are used, a candle lamp has no potential safety risk of fire. The appearance of the candle lamp can be cleverly designed more flexibly than a traditional candle, and the candle lamp will not be blown out. Therefore, the candle lamp is more ideal for window displaying, decorative lighting, mood lighting, table lighting in a restaurant/bar, and party lighting held in gardens, ponds, boats, or backyards at night, and is also easy to carry. Most of existing LED simulated flame effects are controlled by a single-chip microcomputer, which achieves many functions such as timing, remote control, and swaying.

However, for the structural design of the candle lamp, the flame light guides are used to simulate the light effect of a real candle. Due to a size limitation on the flame light guides, the flame simulation effect of the flame light guide can only be controlled in terms of brightness. The brightness of a flame is determined by a size of the flame generated by burning. Therefore, simulation with the flame light guides cannot achieve a real flame lighting effect. To this end, it is necessary to provide an improved technical solution to solve the above problems.

SUMMARY

In order to overcome the above situation, the present disclosure aims to provide a technical solution capable of solving the above problems.

A lamp with a flame simulation effect achieved by light emission from through holes includes a base, and further includes:

a light emitting module, arranged on the base and configured to generate a light source;

a light guide portion, arranged on the base and covering the light emitting module, wherein the light guide portion is configured to guide and diffuse the light source generated by the light emitting module;

a light shield, arranged on the base and covering the light emitting module, wherein dense through holes for exporting the light source to the outside are formed in the light shield;

an electric control module, mounted inside the base and electrically connected to the light emitting module to control the light emitting module to achieve a timed ON or OFF lighting effect; and a power supplying module, arranged inside the base and electrically connected to the electric control module to supply electric energy, wherein the light guide portion is of a strip-type structure vertically arranged on the base, and the light shield sleeves the light guide portion.

Preferably, the light emitting module includes a bottom plate, a light emitting diode (LED) plate arranged on the bottom plate, and a plurality of LEDs arranged on the LED plate; the LEDs are electrically connected to the electric control module; and the light emitting module is fixed on the base through the bottom plate.

Preferably, the LED plate is of a long-strip-type structure; the LED plate is vertically arranged on the bottom plate; a top cover is further arranged at an upper end of the LED plate; the plurality of LEDs are uniformly arranged on two surfaces of the LED plate; the light guide portion is of a tubular structure; the light guide portion is arranged between the top cover and the bottom plate, and sleeves the LED plate; and the light guide portion abuts against an inner wall of the light shield.

Preferably, the light guide portion is made of a milky white plastic material, and a surface of the light guide portion is provided with a semi-transparent frosted surface.

Preferably, the base is of a columnar vacant shell structure with an opened top; a first concave platform structure is arranged at an upper end of the base located on an outer wall; and the light shield is fixedly plugged on the first concave platform structure.

Preferably, a second concave platform structure is arranged at an upper end of an inner wall of the base; a third concave platform structure is further arranged on the second concave platform structure; the light emitting module is fixedly mounted on the third concave platform structure; and the power supplying module is fixed inside the base through the second concave platform structure.

Preferably, the electric control module is arranged at a bottom position inside the base; the power supplying module includes a lithium battery, a first battery holder, a second battery holder, and a threading fixing ring; the threading fixing ring is mounted on the second concave platform structure; the first battery holder is restrained below the threading fixing ring; the second battery holder is arranged on the power supplying module; and the lithium battery is electrically connected between the first battery holder and the second battery holder through a spring.

Preferably, the electric control module includes a printed circuit board assembly (PCBA) fixed at the bottom position inside the base; an integrated circuit (IC) chip, a power management circuit, a charging interface, and a control button are integrated on the PCBA; the charging interface is electrically connected to the lithium battery through the power management circuit; the control button and the charging interface are both exposed out of the base; and the power management circuit, the control button, and the light emitting module are all electrically connected to the IC chip.

Preferably, a soft press member is arranged in the middle of a lower end of the base; the soft press member is an antiskid structure at the bottom of the base; and the control button and the soft press member are in mechanical fit with each other.

Compared with the prior art, the present disclosure has the beneficial effects:

By the adoption of the structure in which the long-strip-type light guide portion cooperates with the light shield with the dense through holes, the electric control module controls the light emitting module to simulate a lighting effect that a flame is sometimes bright and sometimes dark, and the light emitting module is controlled, on the basis of lengthening a light source, to simulate a flame lighting effect, so that the light guide portion can simulate a lighting effect that light is gradually weakened from bottom to top. During use, changeable light emitted from the dense through holes can be presented to a user, so that an effect of igniting a candle in the light shield is simulated. The light shield is used to cover the light emitting module, and the light guide portion guides and diffuses the light source, so that a position of a light emitting source and the light emitting module are both blurred; a phenomenon that the user directly stares at the light emitting source is visually eliminated; and a purpose of simulating a candle lamp is achieved by a blurring effect, thereby achieving a more real flame lighting effect.

The LED plate is the vertically mounted long-strip-type structure, and the uniform LEDs are arranged on the two surfaces of the LED plate, so that the different LEDs can be controlled to be turned on or turned off within different time periods to simulate a flowing effect of a flame. That is, in a burning process, the flame is sometimes static and sometimes dynamic. In the dynamic state, the flame is constantly rising. Due to a flowing horse race lamp control method, according to the blurring and light homogenization effects of the light guide portion and the light shield, a real flame burning effect can be simulated, achieving an effect of simulating static and dynamic flames.

Additional aspects and advantages of the present disclosure will be provided in the following descriptions, and will become apparent from the following descriptions or be learned through the practice of the present disclosure.

BRIEF DESCRIPTION OF THE DRAWINGS

In order to describe the embodiments of the present disclosure or the technical solutions in the prior art more clearly, drawings required to be used in the embodiments or the illustration of the existing art will be briefly introduced below. Obviously, the drawings in the illustration below are merely some embodiments of the present disclosure. Those ordinarily skilled in the art also can acquire other drawings according to the provided drawings without doing creative work.

Figure 1:
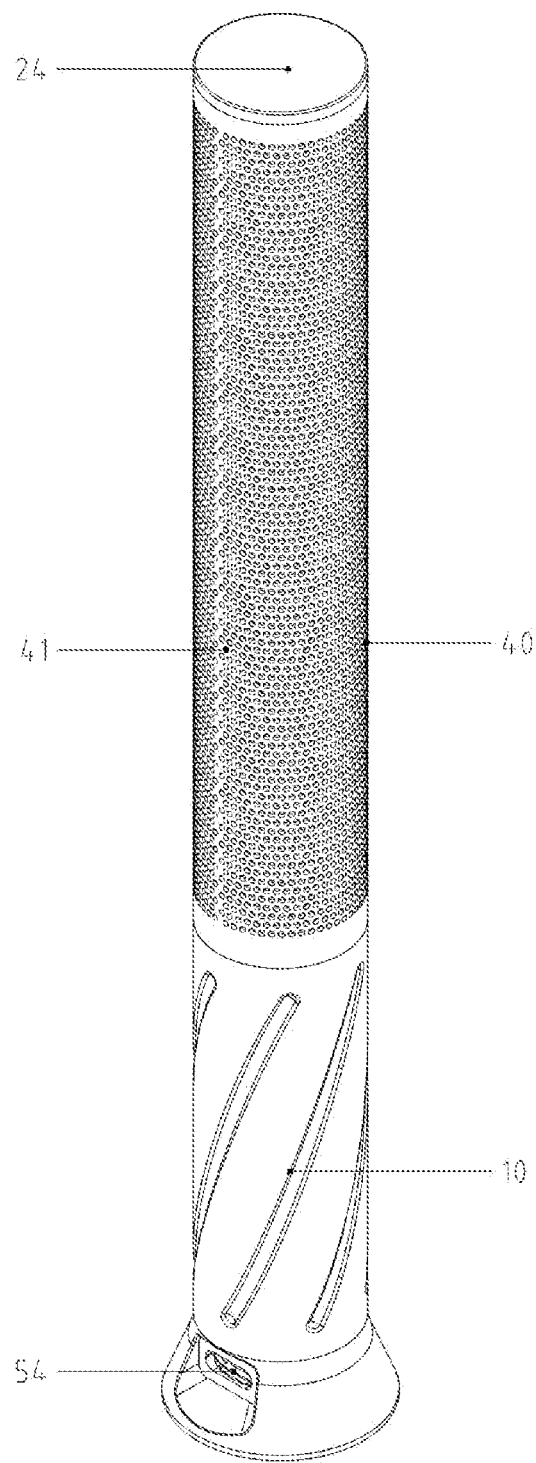
FIG. 1 is a schematic structural diagram of the present disclosure.

Reference numerals and names in the drawings are as follows:

base 10, first concave platform structure 11, second concave platform structure 12, third concave platform structure 13, light emitting module 20, bottom plate 21, LED plate 22, LED 23, top cover 24, light guide portion 30, light shield 40, through hole 41, electric control module 50, PCBA 51, IC chip 52, power management circuit 53, charging interface 54, control button 55, soft press member 56, power supplying module 60, lithium battery 61, first battery holder 62, second battery holder 63, and threading fixing ring 64.

DETAILED DESCRIPTION OF THE EMBODIMENTS

The technical solutions in the embodiments of the present disclosure will be described clearly and completely below. Obviously, the embodiments described herein are only part of the embodiments of the present disclosure, not all the embodiments. Based on the embodiments in the present disclosure, all other embodiments obtained by those of ordinary skill in the art without creative work shall fall within the protection scope of the present disclosure.

Figure 2:
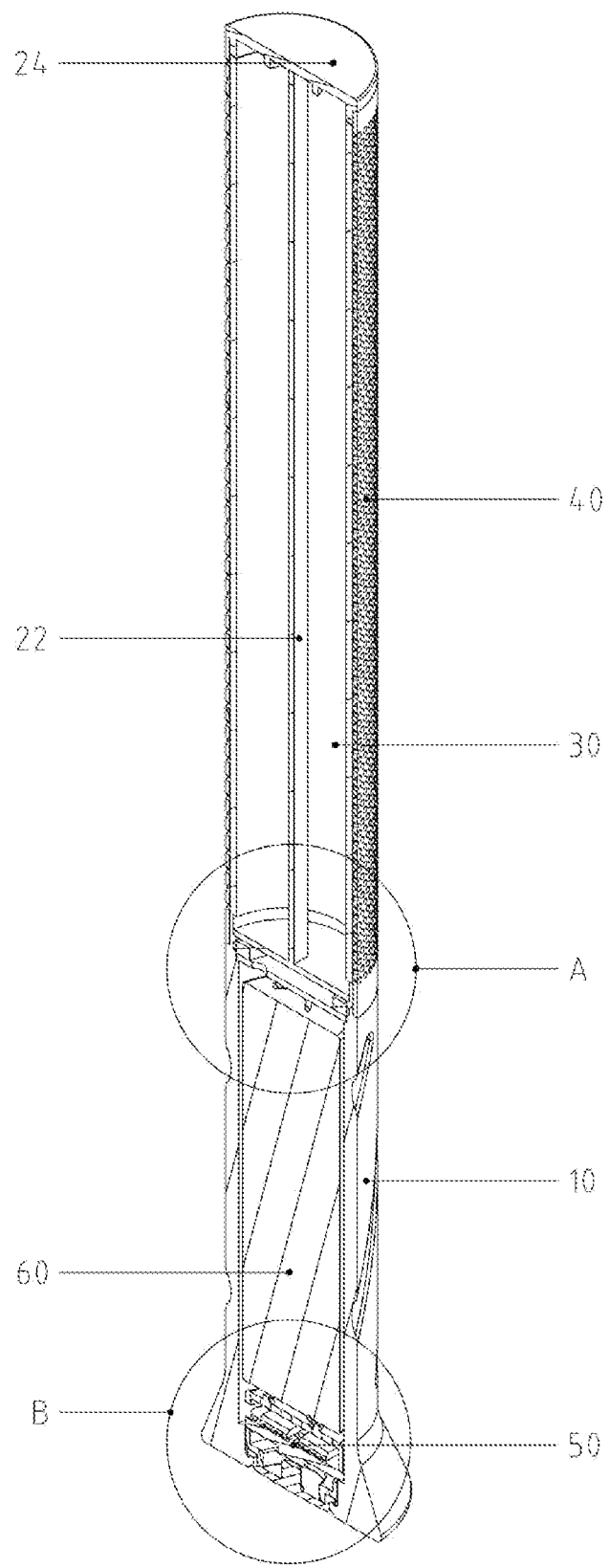
FIG. 2 is a structural sectional diagram of the present disclosure.
Figure 3:
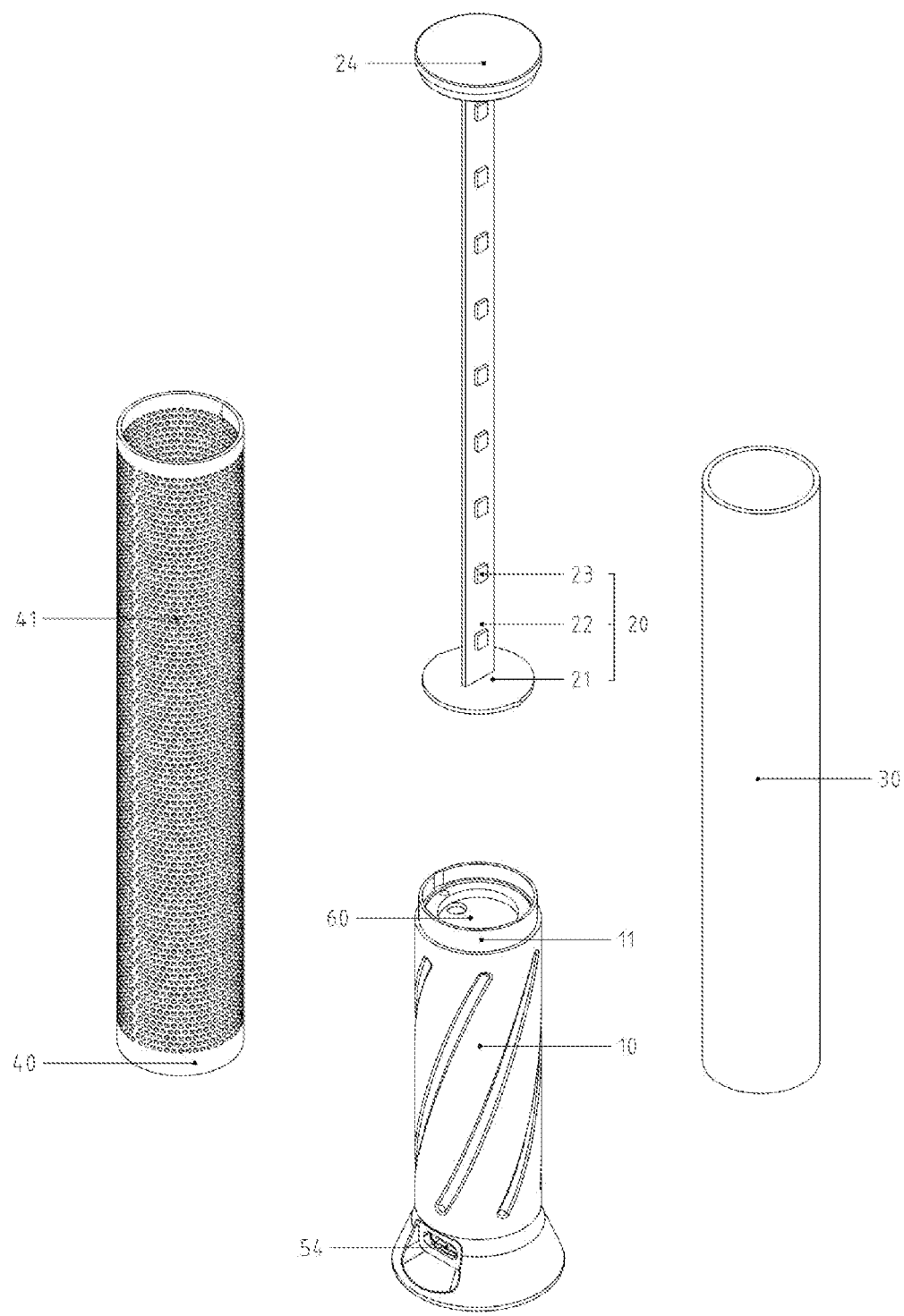
FIG. 3 is an exploded structural diagram of the present disclosure.
Figure 4:
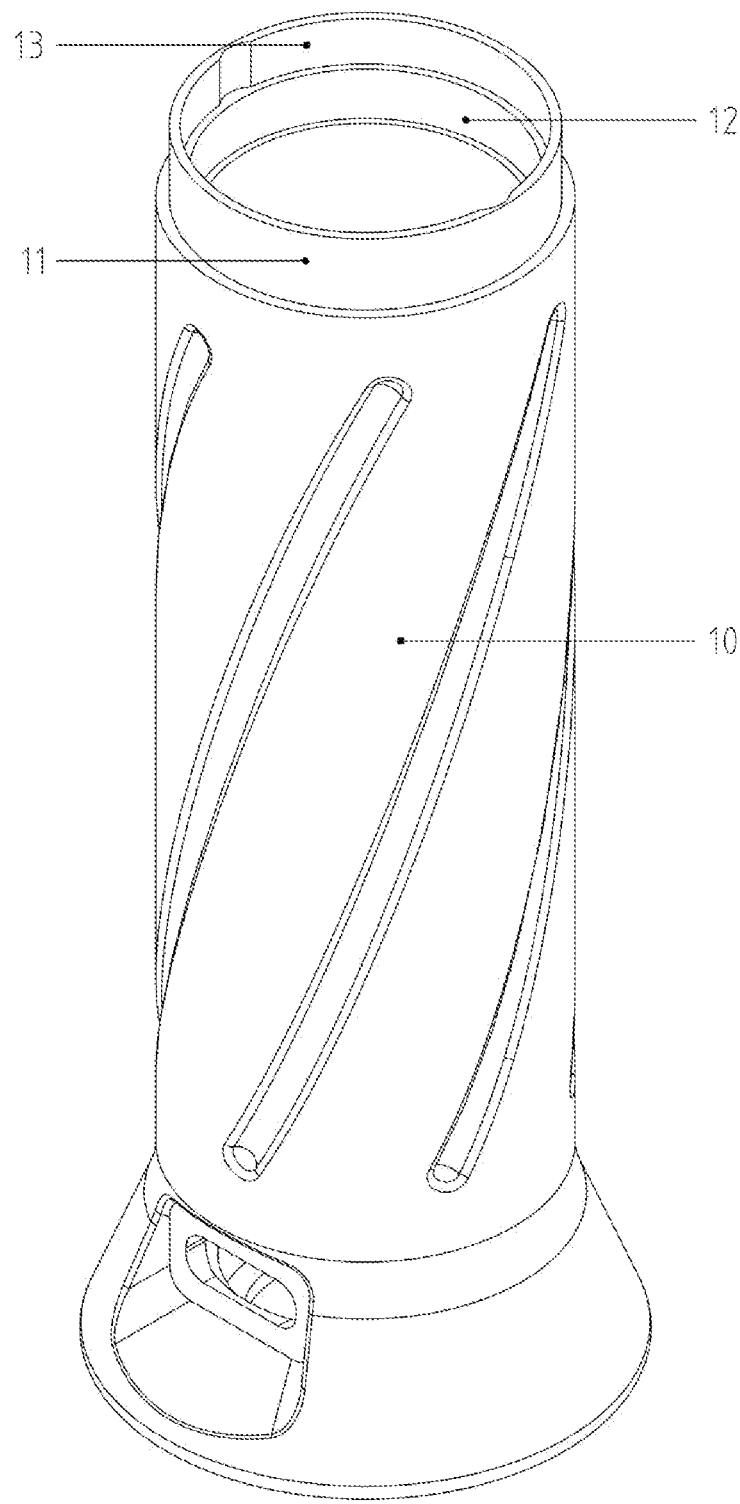
FIG. 4 is a schematic structural diagram of a base in the present disclosure.
Figure 5:
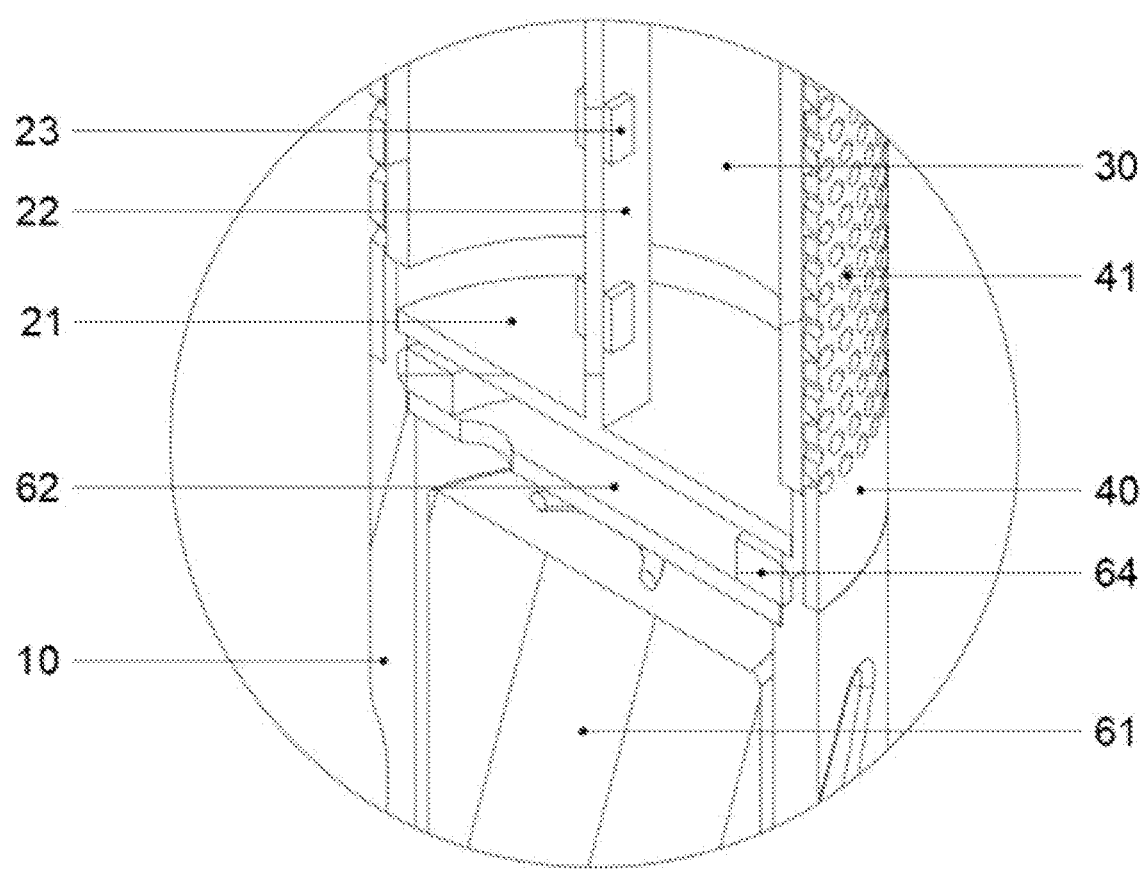
FIG. 5 is a schematic structural diagram of the part A in FIG. 2 of the present disclosure.
Figure 6:
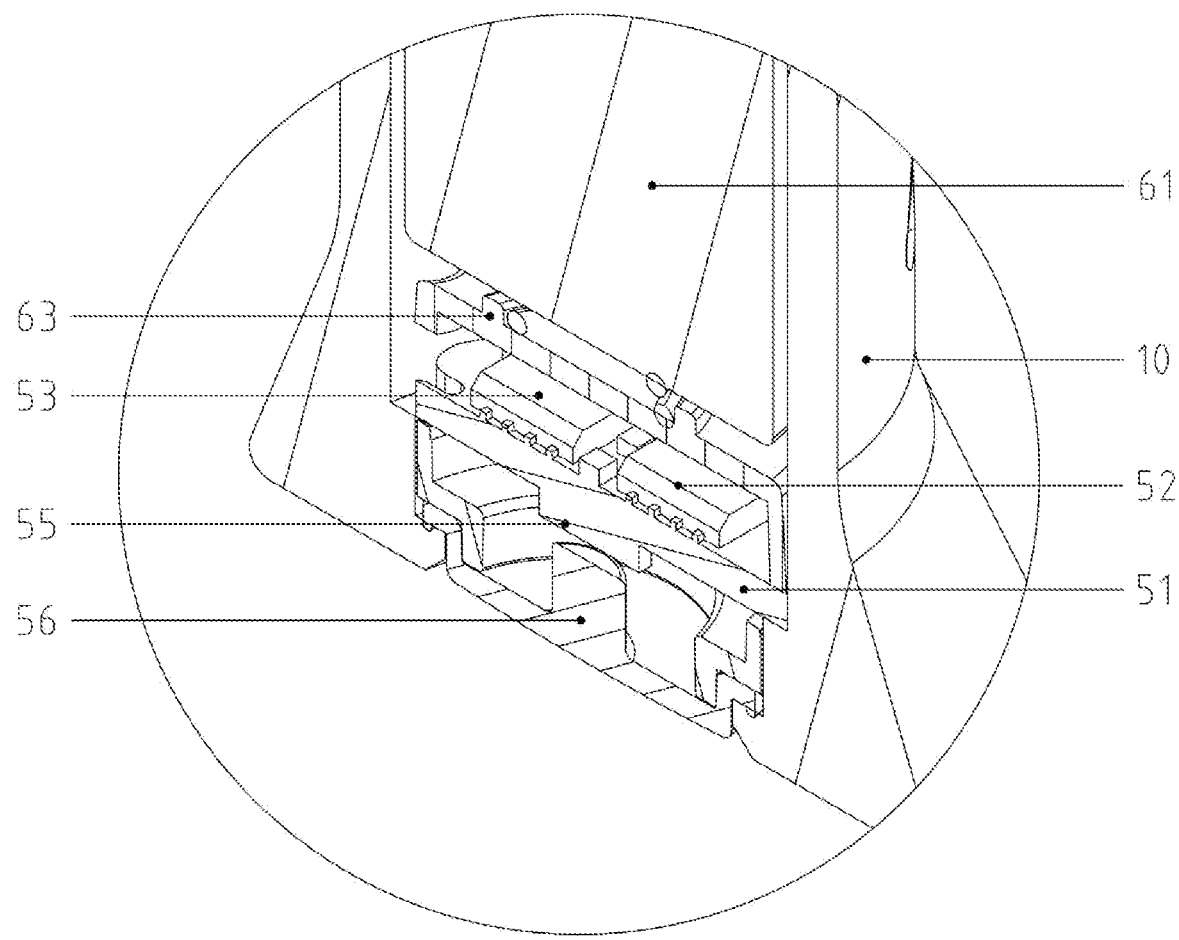
FIG. 6 is a schematic structural diagram of the part B in FIG. 2 of the present disclosure.

Referring to FIG. 1 to FIG. 6, in an embodiment of the present disclosure, a lamp with a flame simulation effect achieved by light emission from through holes includes a base and further includes:

a light emitting module 20, arranged on the base 10 and configured to generate a light source;

a light guide portion 30, arranged on the base 10 and covering the light emitting module 20, wherein the light guide portion 30 is configured to guide and diffuse the light source generated by the light emitting module 20;

a light shield 40, arranged on the base 10 and covering the light emitting module 20, wherein dense through holes 41 for exporting the light source to the outside are formed in the light shield 40;

an electric control module 50, mounted inside the base 10 and electrically connected to the light emitting module 20 to control the light emitting module 20 to achieve a timed ON or OFF lighting effect; and a power supplying module 60, arranged inside the base 10 and electrically connected to the electric control module 50 to supply electric energy, wherein the light guide portion 30 is of a strip-type structure vertically arranged on the base 10, and the light shield 40 sleeves the light guide portion 30.

In the above technical solution, by the adoption of the structure in which the long-strip-type light guide portion 30 cooperates with the light shield 40 with the dense through holes 41, the light source generated by the light emitting module 20 is first guided by the light guide portion 30, thereby generating a long-strip-type light source. The light source is controlled by the electric control module 50. The light emitting module 20 is turned on according to a set program, which mainly achieves an effect of simulating a flame by regular turning-on or turning-off. The light source irradiates the light shield 40 through the through holes 41. In order to ensure a light shielding effect, the light shield is made of a metal material, generally an aluminum material, which can be rust-proof, light, and thin. By combining these characteristics, during use, changeable light emitted from the dense through holes can be presented to a user, so that an effect of igniting a candle in the light shield 40 is simulated. The light shield 40 is used to cover the light emitting module 20, and the light guide portion 30 guides and diffuses the light source, so that a position of a light emitting source and the light emitting module 20 are both blurred; a phenomenon that the user directly stares at the light emitting source is visually eliminated; and a purpose of simulating a candle lamp is achieved by a blurring effect, thereby achieving a more real flame lighting effect.

Referring to FIG. 1, FIG. 2, FIG. 3, and FIG. 5, according to the structural setting of the light emitting module 20, the light emitting module 20 includes a bottom plate 21, an LED plate 22 arranged on the bottom plate 21, and a plurality of LEDs 23 arranged on the LED plate 22. The LEDs 23 are electrically connected to the electric control module 50. The light emitting module 20 is fixed on the base 10 through the bottom plate 21. In addition, a more real flame lighting effect can be achieved according to the structural setting of the light emitting module 20. The LED plate 22 is set to be of a long-strip-type structure. Furthermore, the LED plate 22 is vertically arranged on the bottom plate 21. A top cover 24 is further arranged at an upper end of the LED plate 22. The plurality of LEDs 23 are uniformly arranged on two surfaces of the LED plate 22. The light guide portion 30 is of a tubular structure. The light guide portion 30 is arranged between the top cover 24 and the bottom plate 21, and sleeves the LED plate 22. The light guide portion 30 abuts against an inner wall of the light shield 40. By use of this structure, the different LEDs 23 can be controlled to be turned on or turned off within different time periods to simulate a flowing effect of a flame. That is, in a burning process, the flame is sometimes static and sometimes dynamic. In the dynamic state, the flame is constantly rising. Due to a flowing horse race lamp control method, according to the blurring and light homogenization effects of the light guide portion 30 and the light shield 40, a real flame burning effect can be simulated, achieving an effect of simulating static and dynamic flames. In addition, the light guide portion 30 is made of a milky white plastic material, and a surface of the light guide portion 30 is provided with a semi-transparent frosted surface. The overall light homogenization effect can be improved, and a dazzling effect is reduced.

Referring to FIG. 2 to FIG. 6, according to the mounting of the light shield 40, the base 10 is of a columnar vacant shell structure with an opened top. A first concave platform structure 11 is arranged at an upper end of the base 10 located on an outer wall, and the light shield 40 is fixedly plugged on the first concave platform structure 11. If they are set to be removable structures, the first concave platform structure 11 and the light shield 40 can be screwed or clamped. If they are set to be non-removable structures, the first concave platform structure 11 and the light shield 40 are glued or welded and fixed. According to the mounting of the light emitting module 20 and the power supplying module 60, a second concave platform structure 12 is arranged at an upper end of an inner wall of the base 10. A third concave platform structure 13 is further arranged on the second concave platform structure 12. The light emitting module 20 is fixedly mounted on the third concave platform structure 13. The power supplying module 60 is fixed inside the base 10 through the second concave platform structure 12. Specifically, the electric control module 50 is arranged at a bottom position inside the base 10. The power supplying module 60 includes a lithium battery 61, a first battery holder 62, a second battery holder 63, and a threading fixing ring 64. The threading fixing ring 64 is mounted on the second concave platform structure 12. The first battery holder 62 is restrained below the threading fixing ring 64. The second battery holder 63 is arranged on the power supplying module 60. The lithium battery 61 is electrically connected between the first battery holder 62 and the second battery holder 63 through a spring. Due to this structural setting, it can be ensured that the overall appearance is a long-strip-type structure, thereby achieving modularized assembling. In addition, the electric control module 50 includes PCBA 51 fixed at the bottom position inside the base 10. An IC chip 52, a power management circuit 53, a charging interface 54, and a control button 55 are integrated on the PCBA 51. The charging interface 54 is electrically connected to the lithium battery 61 through the power management circuit 53. The control button 55 and the charging interface 54 are both exposed out of the base 10. The power management circuit 53, the control button 55, and the light emitting module 20 are all electrically connected to the IC chip 52. In order to fully use the structure, a soft press member 56 is arranged in the middle of a lower end of the base 10. The soft press member 56 is an antiskid structure at the bottom of the base 10. The control button 55 and the soft press member 56 are in mechanical fit with each other. The lighting effect of the light emitting module 20 can be controlled through the control button 55. In this way, the user can trigger the control button 55 by directly pressing the control button 55 or tapping an upper end of the lamp.

For those skilled in the art, it is apparent that the present disclosure is not limited to the details of the demonstrative embodiments mentioned above, and that the present disclosure can be realized in other specific forms without departing from the spirit or basic features of the present disclosure. Therefore, from any point of view, the embodiments should be regarded as exemplary and non-limiting. The scope of the present disclosure is defined by the appended claims rather than the above description. Therefore, all changes falling within the meanings and scope of equivalent elements of the claims are intended to be included in the present disclosure.

What is claimed is:

1. A lamp with a flame simulation effect achieved by light emission from through holes, comprising a base, and further comprising:
  a light emitting module, arranged on the base and configured to generate a light source;
  a light guide portion, arranged on the base and around the light emitting module, wherein the light guide portion is configured to guide and diffuse the light source generated by the light emitting module;
  a light shield, arranged on the base and covering around the light guide portion, wherein the light shield is provided with a plurality of dense through holes for exporting the light source guided and diffused through the light guide portion to the outside;
  an electric control module, mounted inside the base and electrically connected to the light emitting module to control the light emitting module to achieve a timed ON or OFF lighting effect; and
  a power supplying module, arranged inside the base and electrically connected to the electric control module to supply electric energy;
  wherein the light emitting module comprises a bottom plate, a light emitting diode (LED) plate arranged on the bottom plate, and a plurality of LEDs arranged on the LED plate; wherein the light emitting module is fixed on the base through the bottom plate; the LED plate is of a long-strip-type structure and vertically arranged on the bottom plate; the plurality of LEDs are uniformly arranged on two surfaces of the LED plate and electrically connected to the electric control module;
  wherein the light guide portion is of a tubular structure vertically arranged on the base, wherein the light guide portion sleeves the LED plate, and the light shield sleeves the light guide portion.

2. The lamp with the flame simulation effect achieved by light emission from the through holes according to claim 1, wherein the light emitting module further comprises a top cover arranged at an upper end of the LED plate; wherein the light guide portion is arranged between the top cover and the bottom plate, and is spaced apart from the LED plate; and the light guide portion abuts against an inner wall of the light shield.

3. The lamp with the flame simulation effect achieved by light emission from the through holes according to claim 2, wherein the base is of a columnar vacant shell structure with an opened top; the base is further provided with a first concave platform structure arranged at an upper end of an outer wall of the base; and the light shield is fixedly plugged on the first concave platform structure.

4. The lamp with the flame simulation effect achieved by light emission from the through holes according to claim 2, wherein the light guide portion is made of a milky white plastic material, and a surface of the light guide portion is provided with a semi-transparent frosted surface.

5. The lamp with the flame simulation effect achieved by light emission from the through holes according to claim 4, wherein the base is of a columnar vacant shell structure with an opened top; the base is further provided with a first concave platform structure arranged at an upper end of an outer wall of the base; and the light shield is fixedly plugged on the first concave platform structure.

6. The lamp with the flame simulation effect achieved by light emission from the through holes according to claim 1, wherein the base is of a columnar vacant shell structure with an opened top; the base is further provided with a first concave platform structure arranged at an upper end of an outer wall of the base; and the light shield is fixedly plugged on the first concave platform structure.

7. The lamp with the flame simulation effect achieved by light emission from the through holes according to claim 5, wherein the base is further provided with a second concave platform structure arranged at an upper end of an inner wall of the base and a third concave platform structure arranged on the second concave platform structure; the light emitting module is fixedly mounted on the third concave platform structure; and the power supplying module is fixed inside the base through the second concave platform structure.

8. The lamp with the flame simulation effect achieved by light emission from the through holes according to claim 6, wherein the electric control module is arranged at a bottom position inside the base; the power supplying module comprises a lithium battery, a first battery holder, a second battery holder, and a threading fixing ring; the threading fixing ring is mounted on the second concave platform structure; the first battery holder is restrained below the threading fixing ring; the second battery holder is arranged on the power supplying module; and the lithium battery is electrically connected between the first battery holder and the second battery holder through a spring.

9. The lamp with the flame simulation effect achieved by light emission from the through holes according to claim 8, wherein the electric control module comprises a printed circuit board assembly (PCBA) fixed at the bottom position inside the base; an integrated circuit (IC) chip, a power management circuit, a charging interface, and a control button are integrated on the PCBA; the charging interface is electrically connected to the lithium battery through the power management circuit; the control button and the charging interface are both exposed out of the base; and the power management circuit, the control button, and the light emitting module are all electrically connected to the IC chip.

10. The lamp with the flame simulation effect achieved by light emission from the through holes according to claim 9, wherein the lamp further comprises a soft press member arranged in the middle of a lower end of the base; wherein the soft press member is an antiskid structure at the bottom of the base; and the control button and the soft press member are in mechanical fit with each other.

11. The lamp with the flame simulation effect achieved by light emission from the through holes according to claim 1, wherein the base is of a columnar vacant shell structure with an opened top; the base is further provided with a first concave platform structure arranged at an upper end of an outer wall of the base; and the light shield is fixedly plugged on the first concave platform structure.

* * * * *